(12) United States Patent
Ross

(10) Patent No.: US 7,856,000 B2
(45) Date of Patent: Dec. 21, 2010

(54) APPARATUS AND METHOD CAPABLE OF IMPROVED COEXISTENCE OF MULTIPLE WIRELESS COMMUNICATION TECHNIQUES

(75) Inventor: Rony Ross, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 1042 days.

(21) Appl. No.: 11/020,499

(22) Filed: Dec. 21, 2004

(65) Prior Publication Data

US 2006/0133334 A1 Jun. 22, 2006

(51) Int. Cl.
*H04W 4/00* (2009.01)
*H04L 12/413* (2006.01)
*H04B 15/00* (2006.01)

(52) U.S. Cl. ............... 370/338; 370/349; 370/447; 370/461; 455/63.1; 455/67.13

(58) Field of Classification Search ............ 370/338, 370/349, 447, 461; 455/63.1, 67.13
See application file for complete search history.

(56) References Cited

U.S. PATENT DOCUMENTS

| | | | | |
|---|---|---|---|---|
| 6,600,726 | B1 * | 7/2003 | Nevo et al. | 370/278 |
| 6,791,997 | B2 * | 9/2004 | Beyer et al. | 370/447 |
| 6,917,606 | B2 * | 7/2005 | Sashihara | 370/338 |
| 6,973,094 | B1 * | 12/2005 | Holloway et al. | 370/445 |
| 6,996,074 | B2 * | 2/2006 | Garcia-Luna-Aceves et al. | 370/278 |
| 7,095,754 | B2 * | 8/2006 | Benveniste | 370/465 |
| 7,162,507 | B2 * | 1/2007 | Carter | 709/200 |
| 7,167,484 | B2 * | 1/2007 | Liang et al. | 370/445 |
| 7,215,659 | B1 * | 5/2007 | Chen et al. | 370/338 |
| 7,340,236 | B2 * | 3/2008 | Liang et al. | 455/277.2 |
| 7,551,561 | B2 * | 6/2009 | Sawabe | 370/235 |
| 7,606,174 | B2 * | 10/2009 | Ochi et al. | 370/255 |
| 2002/0136183 | A1 * | 9/2002 | Chen et al. | 370/338 |
| 2002/0136233 | A1 * | 9/2002 | Chen et al. | 370/445 |
| 2004/0048577 | A1 | 3/2004 | Godfrey | |
| 2004/0100929 | A1 * | 5/2004 | Garcia-Luna-Aceves | 370/338 |
| 2004/0116075 | A1 * | 6/2004 | Shoemake et al. | 455/41.2 |
| 2005/0058151 | A1 * | 3/2005 | Yeh | 370/445 |
| 2005/0059347 | A1 * | 3/2005 | Haartsen | 455/41.2 |

(Continued)

FOREIGN PATENT DOCUMENTS

EP    1119137    7/2001

(Continued)

OTHER PUBLICATIONS

Nada Golmie et al., "Bluetooth and WLAN Coexistence: Challenges and Solutions", IEEE Wireless Communications, Dec. 2003, pp. 22-29.*

(Continued)

*Primary Examiner*—Alpus H Hsu
(74) *Attorney, Agent, or Firm*—Caven & Aghevli LLC

(57) ABSTRACT

Techniques involving wireless communications are disclosed. For instance, an embodiment provides an apparatus having a first transceiver and a second transceiver. The first transceiver engages in wireless communication using a first technique that employs control packets. The second transceiver engages in wireless communication using a second technique. The second technique may establish a transmission priority over the first technique. Also, the first transceiver may refrain from transmitting the control packets at predetermined times to prevent collisions with prioritized transmissions received by the second transceiver.

17 Claims, 6 Drawing Sheets

U.S. PATENT DOCUMENTS

2006/0067312 A1 * 3/2006 Ross ......................... 370/388
2006/0084383 A1 * 4/2006 Ibrahim et al. ............. 455/41.2

FOREIGN PATENT DOCUMENTS

EP 1119137 A1 * 7/2001
EP 1389855 2/2004

OTHER PUBLICATIONS

Shellhammar S—IEEE 802.15.2 Clause 14.1—Collaborative C Oexistince Mechanism—Jul. 12, 2001 pp. 1-4.
Godfrey T: 802.11 and Bluetooth Coexistence Techniques—Nov. 4, 2002 Technical Report.
PCT/US2005/046933 International Search Report and Written Opinion Mailed Apr. 24, 2006.

* cited by examiner

APPARATUS AND METHOD CAPABLE OF IMPROVED COEXISTENCE OF MULTIPLE WIRELESS COMMUNICATION TECHNIQUES

BACKGROUND

As wireless devices proliferate, new techniques to accomplish wireless communication are developed. At times it may be advantageous to combine two or more wireless techniques into one apparatus, system or method. One disadvantage in combining two or more wireless communication techniques, however, is that the transmission and reception of two wireless techniques may interfere with each other.

Thus, there is a continuing and strong need in the wireless industry to enable the utilization of a plurality of wireless communication techniques in an apparatus, system or method while decreasing the interference that such plurality of wireless communication techniques may cause each other.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
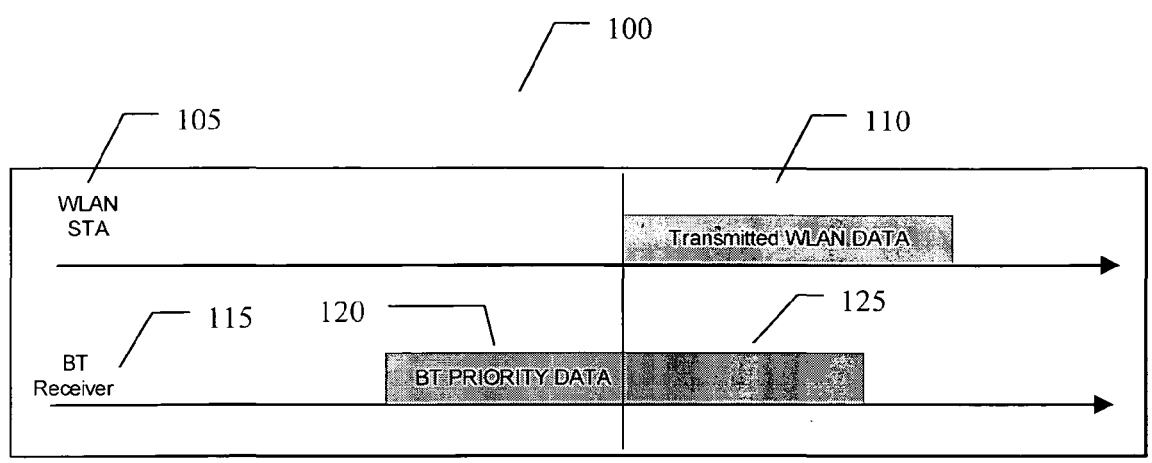
FIG. 1 illustrates a Bluetooth and WLAN collision without "Bluetooth coexistence phase 2"

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN) or wide are networks (WAN), or personal area networks (PAN, and the like).

When two wireless communication techniques share the same platform difficulties may arise. For example, and not by way of limitation, when a WLAN device and a Bluetooth device reside on the same platform, received Bluetooth packets may collide with transmitted WLAN packets. As shown in FIG. 1, shown generally as 100, is illustrated a Bluetooth and WLAN collision without "Bluetooth coexistence phase 2"; with Bluetooth receiver depicted at 115 and WLAN Station at 105, Bluetooth priority data is depicted at 120. Transmitted WLAN data 110 may collide 125 without "Bluetooth coexistence phase 2". This interference may be the most severe when the collision occurs over Bluetooth Priority packets.

Figure 2:
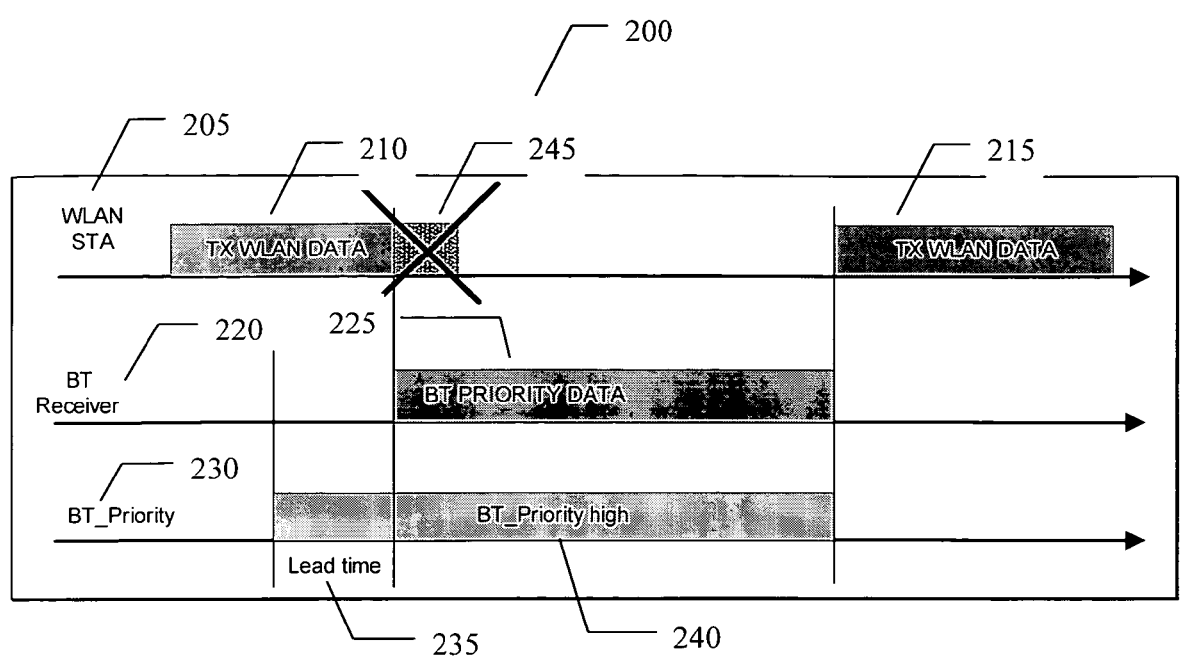
FIG. 2 is an illustration of Bluetooth and WLAN collision avoidance by a KILL and defer mechanism.

"Bluetooth Coexistence Phase 2" defines, in the Bluetooth standard, a mechanism to protect received Bluetooth Priority packets from colliding with transmitted 802.11(a wireless local area network standard) data packets. The Bluetooth device asserts a BT_Priority signal short time (AKA Lead Time) before it expects to receive a Priority packet. Upon the assertion of the BT_Priority signal and after the expiration of the Lead Time, the WLAN device is refraining from transmitting 802.11 data packets until the BT_Priority is de-asserted. This is done by stopping the transmission in the middle of a transmitted packet (a.k.a. KILL) or by differing the transmission of the data packet. FIG. 2, generally at 200, is an illustration of Bluetooth and WLAN collision avoidance by a KILL and defer mechanism with wireless station 205 transmitting wireless LAN data 210 and BT receiver 220 establishing BT priority data 225. At 230 BT priority sets lead time 235 enabling the KILL of WLAN transmit data 245. WLAN transmit data is thus deferred as shown at 215.

Figure 3:
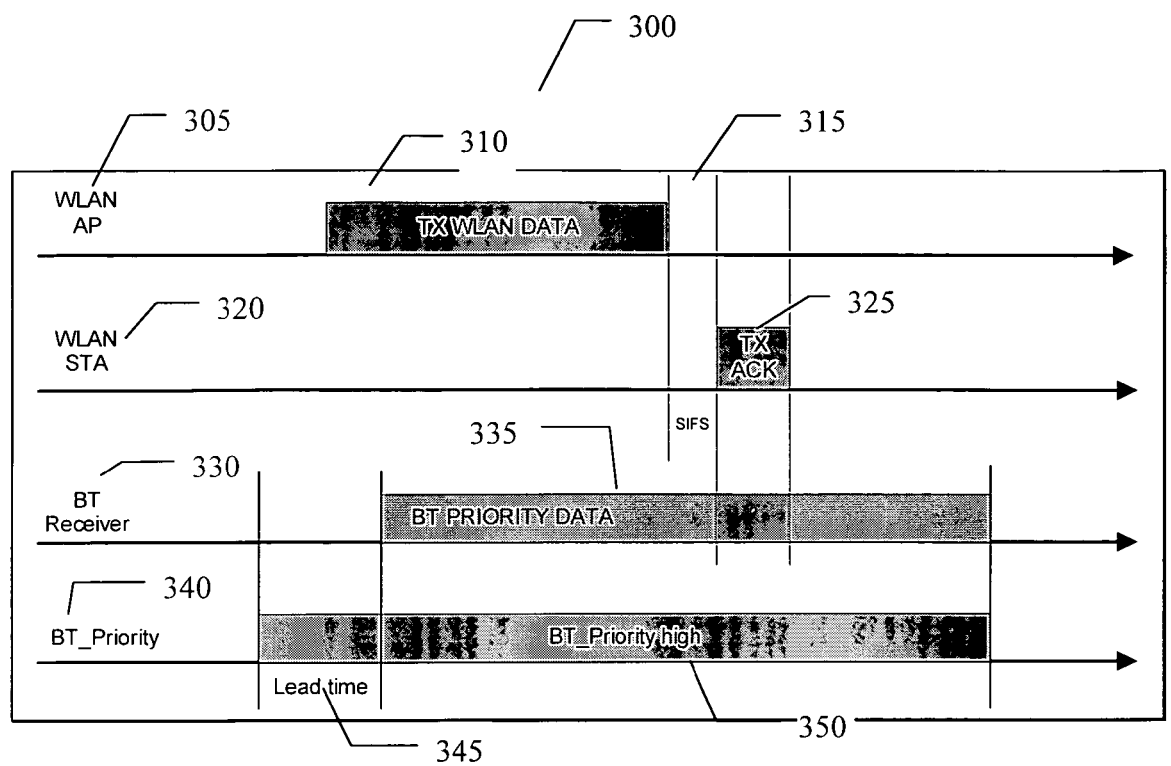
FIG. 3 is an illustration of an embodiment of the present invention with Bluetooth and WLAN collisions due to 802.11 control packets.

However, when the BT_Priority signal is asserted, "Bluetooth Coexistence Phase 2" does not prevent the WLAN station from transmitting 802.11 control packets such as acknowledgment and CTS. Therefore, the transmitted control packets collide with Bluetooth Priority packets as illustrated in FIG. 3, at 300, where there occurs a Bluetooth and WLAN collision due to 802.11 control packet. As a result, Bluetooth performance falls below the minimal requirement for playing an audio stream. In the example of FIG. 3, Wireless Local Area Network (WLAN) Access Point (AP) 305 transmits WLAN data at 315 and WLAN Station 320 transmits an Acknowledgment packet (control packet) at 325. BT receiver 330 receives priority data 335, but as seen at 315, collides with TX ACK 325, even though BT priority is set at 340 thereby establishing BT high priority 350 and lead time 345. Thus, the received 802.11 data packet is causing the WLAN station to transmit 802.11 a control packet. The 802.11 control packet collides with the received Bluetooth Priority packet although it is protected by the BT_Priority signal.

Figure 4:
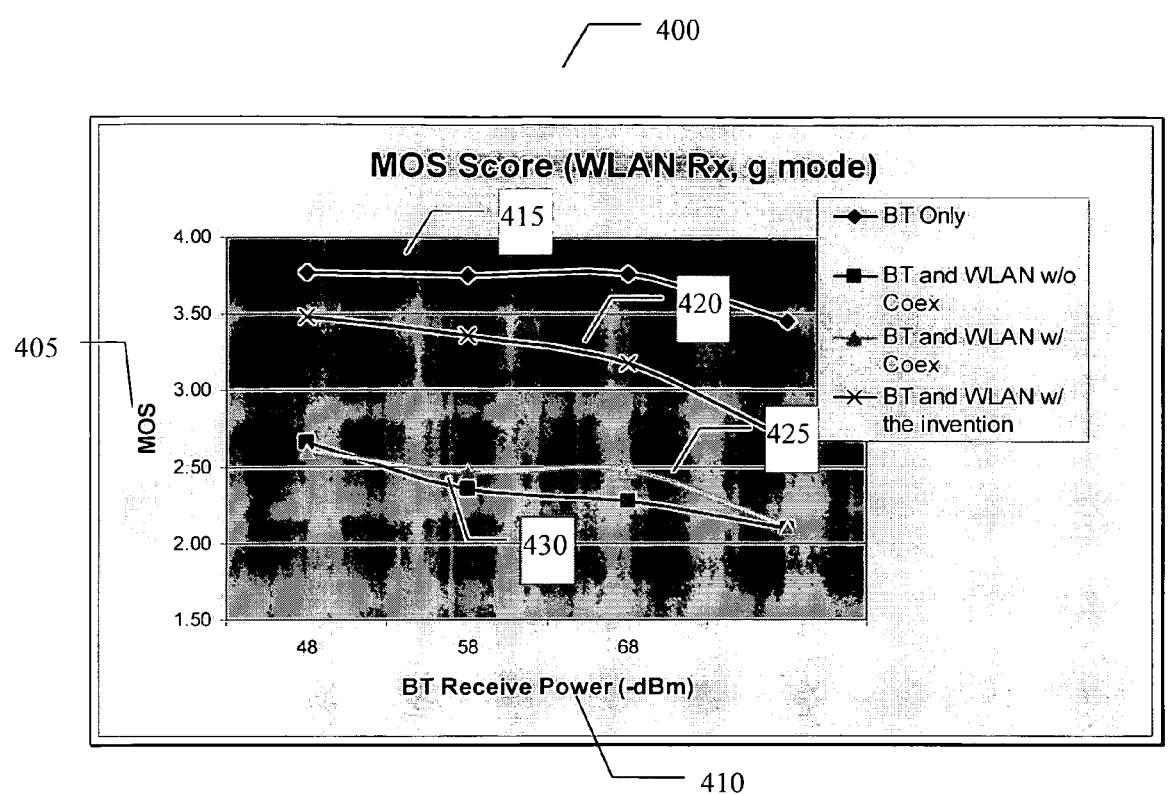
FIG. 4 is a graphical comparison of a Bluetooth MOS score.

FIG. 4, at 400, is a graphical comparison of a Bluetooth MOS score. MOS is a way to measure the quality of an audio stream. Higher MOS scores result in higher voice quality. A MOS score higher then 3 is needed in order have good audio quality. The chart compares:

"BT Only"—The system contains only a Bluetooth device w/o WLAN device.

"BT and WLAN without Coex"—The system contains a Bluetooth device and a WLAN device. There is no coexistence mechanism between them.

"BT and WLAN with Coex"—The system contains a Bluetooth device and a WLAN device. The system implements "Bluetooth coexistence phase 2" mechanism.

"BT and WLAN with an embodiment of the present invention"—The system contains a Bluetooth device and a WLAN device. The system implements the invention in addition to the "Bluetooth coexistence phase 2" mechanism. As can be seen, the MOS score with the invention is much higher then without. BT only is shown at 415, BT and WLAN without prior Coexistence is shown at 430, BT and WLAN with the prior Coexistence is depicted at 425 and BT and WLAN with the implementation of the present invention is shown at 420.

An embodiment of the present invention provides an apparatus, comprising a first transceiver capable of wireless communication using a first technique, the first technique including the use of control packets; a second transceiver capable of wireless communication using a second technique, the second technique capable of establishing a transmission priority over the first technique; and wherein the first transceiver is capable of refraining from transmitting the control packets at predetermined times to prevent collisions with prioritized transmissions by the second transceiver. Although not limited in this respect, the first technique may be a Wireless Local Area Network standard (such as the Institute for Electrical and Electronic Engineers [IEEE] 802.11 standard) and the second technique may be a Bluetooth Standard. Thus, an embodiment of the present invention may provide an algorithm for the improvement of Bluetooth performance in a WLAN/Bluetooth coexistence platform and an improvement may be gained by reducing the number of collisions between transmitted 802.11 control packets and received Bluetooth Priority packets. The collision may be avoided by refraining from transmitting some of the 802.11 control packets when the Bluetooth device is receiving Priority packets. The refrained control packets may be chosen in such a way that the degradation in 802.11 performance is minimal.

Although not limited in this respect, the first transceiver may refrain from transmitting the control packets at predetermined times by implementing a refraining process (also may be referred to herein as a refraining algorithm, although the process of the present invention are not limited to being algorithmic in nature). It is the refraining processes responsibility to balance between Bluetooth performance enhancement and WLAN performance degradation (again as mentioned above, the present invention is not limited to WLAN and Bluetooth wireless communication techniques but rather any wireless communication technique that may use control packets and may need to prioritize wireless communication). Refraining to send control packets might cause the AP to increase its back-off counters and to rate-scale to lower rates. The refraining process may prevent the AP from doing so by selectively choosing which control packets may be refrained and therefore cause only limited WLAN performance degradation.

Further, the refraining process may include, but are not required to include, selecting which control packets should be refrained and which should be transmitted based on the prevention of expected collisions with the prioritized transmissions by the second transceiver and the refraining process may balance between Bluetooth performance enhancement and WLAN performance degradation. Again, this balancing is not required and the present invention is not limited to the Bluetooth and WLAN wireless communication techniques.

In an embodiment of the present invention and not limited in this respect, the first transceiver may be in wireless communication with an Access Point (AP) and the refraining process may prevent the AP from rate scaling down and increasing its back-off counters by selectively choosing which control packets may be refrained, thereby providing only limited WLAN performance degradation.

The refraining process may include, but are not limited to, for each control packet, not refraining from transmitting it, if the previous control packet was refrained or the refraining process may include preventing continuous failures by preventing the AP both from using long back-off periods and from rate-scaling to lower rates. Again, the present invention is not limited to using APs and not limited to specific back-off periods and a specific rate scale.

In an embodiment of the present invention, the refraining process may include choosing an N which limits the percentage of refrained packets to be 1−1/N for every Nth (where N=1,2,3 . . . ) control packet and N may be chosen to limit the packet error rate (PER) in such a way that the AP would not rate-scale down.

In an embodiment of the present invention the refraining process may include: determining if the second transceiver has established a transmission priority, and if it has not, scheduling a control packet for transmission, and if it has, determining if a previous control packet was dropped due to the second transceiver establishing a transmission priority; and scheduling the packet for transmission if the previous control packet was dropped due to the second transceiver establishing a transmission priority or dropping the control packet from transmission if the previous control packet was not dropped.

An embodiment of the present invention may further provide a method of providing enhanced coexistence in an apparatus capable of wireless communication using a plurality of wireless communication techniques, comprising: establishing a transmission priority for a first wireless communication technique; refraining from transmitting control packets of a second wireless communication technique at predetermined times to prevent collisions with prioritized transmissions by the first wireless communication technique. In a method of the present invention, the first wireless communication technique may be a Wireless Local Area Network standard and the second wireless communication technique may be a Bluetooth Standard.

Figure 5:
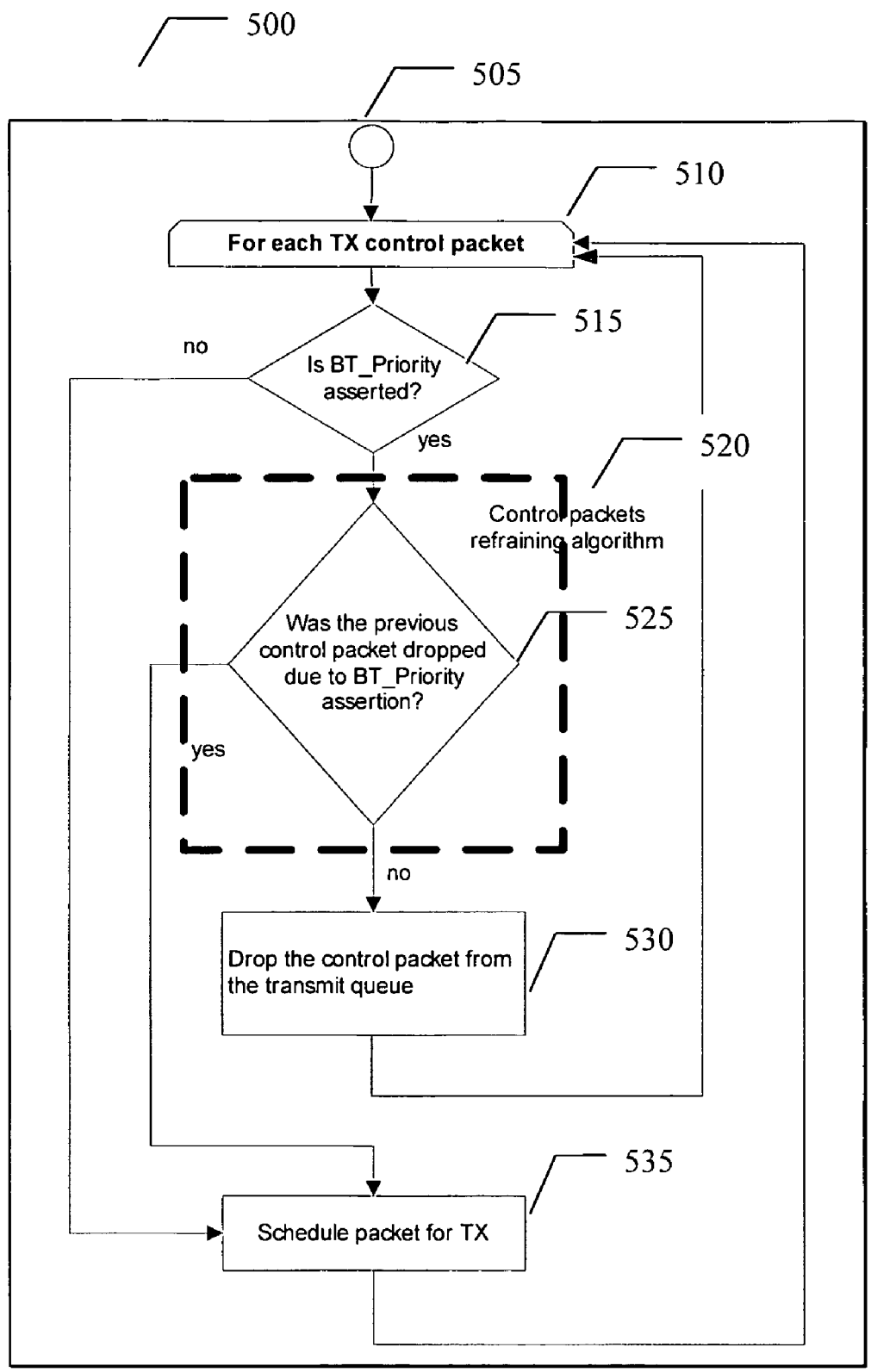
FIG. 5 is a diagram illustrating the Bluetooth performance enhancement in a Bluetooth/WLAN coexistence platform.

Turning now to FIG. 5, at 500, is generally illustrated one example (and the present invention should not be understood to be limited to this one example as any number of series of refraining processes are intended to be within the scope of the present invention) of a refraining process that may be utilized in the present invention. The refraining process may begin at 505 and determine for transmit control packet 510 whether a BT Priority is asserted 515. If yes, at 515 it is determined if the previous control packet was dropped. If it had been dropped, the TX packet is scheduled for transmission at 535. If it had not been dropped, at 530 the control packet is dropped from the transmit queue and a return to step 510 is accomplished. If a BT priority had not been asserted at 515, the TX packet is scheduled for transmission at 535, thereafter returning to step 510.

An embodiment of the present invention further provides an article comprising a storage medium having stored thereon instructions, that, when executed by a computing platform, results in providing enhanced coexistence in an apparatus capable of wireless communication using a plurality of wireless communication techniques by establishing a transmission priority for a first wireless communication technique; and refraining from transmitting control packets of a second wireless communication technique at predetermined times to prevent collisions with prioritized transmissions by the first wireless communication technique.

Figure 6:
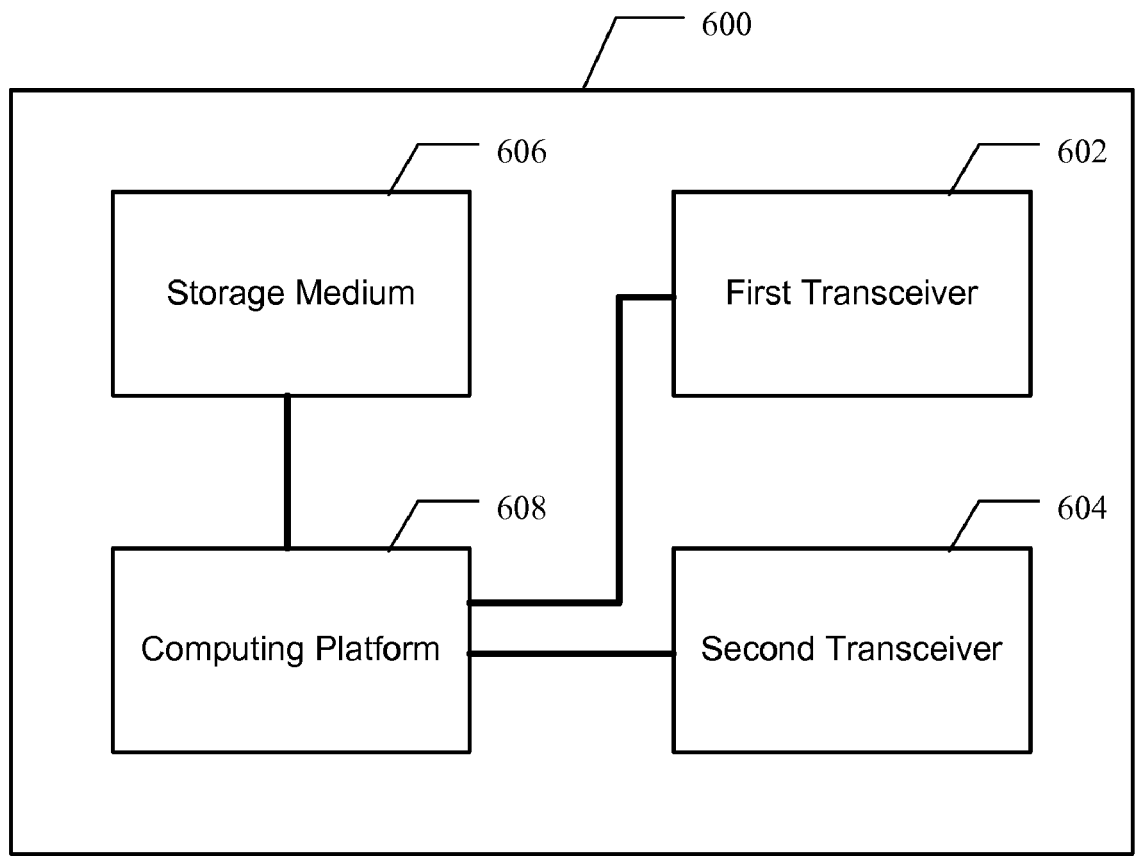
FIG. 6 is a diagram illustrating an apparatus.

Accordingly, FIG. 6 is a diagram of an apparatus 600 that may provide features described herein. Apparatus 600 includes a first transceiver 602, a second transceiver 604, a storage medium 606, and a computing platform 608. First transceiver 602 may operate in accordance with a first wireless communication technique and second transceiver 604 may operate in accordance with a second wireless communication technique, as described herein. Storage medium 606 and computing platform 608 may operate, for example, as described in the preceding paragraph.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus, comprising:
   a first transceiver capable of wireless communication using a first technique, said first technique including the use of control packets;
   a second transceiver capable of wireless communication using a second technique, said second technique capable of establishing a transmission priority over said first technique; and
   wherein said first transceiver is to refrain from transmitting any data packets and at least some of said control packets at predetermined times, said refraining to prevent collisions with prioritized transmissions received by said second transceiver;
   wherein said refraining is in accordance with a refraining process, the refraining process to select which control packets should be refrained and which should be transmitted at the predetermined times.

2. The apparatus of claim 1, wherein said refraining process includes selecting which control packets should be refrained and which should be transmitted based on the prevention of expected collisions with said prioritized transmissions by said second transceiver.

3. The apparatus of claim 1, wherein said refraining process balances between enhancement of wireless communication of the second technique and performance degradation of wireless communication of the first technique.

4. The apparatus of claim 1, wherein said refraining process includes for each control packet, not refraining from transmitting it, if the previous control packet was refrained.

5. The apparatus of claim 1, wherein said refraining process includes choosing an N which limits the percentage of refrained packets to be 1−1/N for every $N_{th}$ (where N=1, 2, 3 . . .) control packet.

6. That apparatus of claim 5:
   wherein the wireless communication using the first technique is with an access point (AP); and
   wherein N is chosen to limit the packet error rate (PER) in such a way that said AP would not rate-scale down.

7. The apparatus of claim 1, wherein said refraining process includes:

determining if said second transceiver has established a transmission priority, and if it has not, scheduling a control packet for transmission, and if it has, determining if a previous control packet was dropped due to said second transceiver establishing a transmission priority; and scheduling packet for transmission if said previous control packet was dropped due to said second transceiver establishing a transmission priority or dropping said control packet from transmission if said previous control packet was not dropped.

8. A method of providing enhanced coexistence in an apparatus capable of wireless communication using a plurality of wireless communication techniques, comprising:

establishing a transmission priority for a first wireless communication technique;

refraining a transceiver from transmitting any data packets and at least some control packets of a second wireless communication technique at predetermined times, said refraining to prevent collisions with prioritized transmissions by said first wireless communication technique;

wherein said refraining is in accordance with a refraining process, the refraining process to select which control packets should be refrained and which should be transmitted at the predetermined times.

9. The method of claim 8, further comprising:

selecting, in said refraining process, which control packets should be refrained and which should be transmitted based on the prevention of expected collisions with said prioritized transmissions by said second transceiver.

10. The method of claim 9, further comprising:

balancing, in said refraining process, between enhancement of wireless communication of the second technique and performance degradation of wireless communication of the first technique.

11. The method of claim 8, further comprising:

refraining or not refraining based on whether or not the previous control packet was refrained.

12. The method of claim 8, wherein said refraining process includes choosing an N which limits the percentage of refrained packets to be $1-1/N$ for every $N_{th}$ (where N=1, 2, 3 . . .) control packet.

13. A tangible storage medium having stored thereon instructions, that, when executed by a computing platform, results in providing enhanced coexistence in an apparatus capable of wireless communication using a plurality of wireless communication techniques by establishing a transmission priority for a first wireless communication technique; and refraining from transmitting any data packets and at least some control packets of a second wireless communication technique at predetermined times to prevent collisions with prioritized transmissions by said first wireless communication technique;

wherein said refraining is in accordance with a refraining process, the refraining process to select which control packets should be refrained and which should be transmitted at the predetermined times.

14. The tangible storage medium of claim 13, further comprising:

selecting, in said refraining process, which control packets should be refrained and which should be transmitted based on the prevention of expected collisions with said prioritized transmissions by said second transceiver.

15. The tangible storage medium of claim 13, further comprising:

balancing, in said refraining process, between performance enhancement of wireless communication of the second technique and performance degradation of wireless communication of the first technique.

16. The tangible storage medium of claim 13, further comprising:

refraining or not refraining based on whether or not the previous control packet was refrained.

17. The tangible storage medium of claim 13, wherein said refraining process includes choosing an N which limits the percentage of refrained packets to be $1-1/N$ for every $N_{th}$ (where N=1, 2, 3 . . .) control packet.

* * * * *